United States Patent
Bertola et al.

(10) Patent No.: US 10,457,095 B2
(45) Date of Patent: Oct. 29, 2019

(54) HUB-BEARING ASSEMBLY FOR A VEHICLE WHEEL

(71) Applicant: Aktiebolaget SKF, Gothenburg (SE)

(72) Inventors: Maurizio Bertola, Piscina (IT);
Daniele Duch, San Gilio (IT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/727,876

(22) Filed: Oct. 9, 2017

(65) Prior Publication Data

US 2018/0126780 A1 May 10, 2018

(30) Foreign Application Priority Data

Oct. 24, 2016 (IT) .................... 102016000106442

(51) Int. Cl.
| | | |
|---|---|---|
| B60B 27/00 | (2006.01) | |
| F16C 33/78 | (2006.01) | |
| F16C 19/14 | (2006.01) | |
| F16C 33/80 | (2006.01) | |

(52) U.S. Cl.
CPC ...... B60B 27/0073 (2013.01); F16C 33/7823 (2013.01); F16C 33/7826 (2013.01); F16C 33/7879 (2013.01); F16C 33/80 (2013.01); F16C 33/805 (2013.01); F16C 19/14 (2013.01); F16C 2326/02 (2013.01)

(58) Field of Classification Search
CPC .. F16C 33/586; F16C 33/7816; F16C 33/782; F16C 33/7823; F16C 33/7826; F16C 33/783; F16C 33/7863; F16C 33/7866; F16C 33/7869; F16C 33/7873; F16C 33/7876; F16C 33/7879; F16C 33/7883; F16C 33/7886; F16C 33/7889; F16C 33/805; B60B 27/0073
See application file for complete search history.

(56) References Cited

U.S. PATENT DOCUMENTS

| | | | |
|---|---|---|---|
| 2010/0259014 A1 | 10/2010 | Nakagawa | |
| 2015/0003766 A1* | 1/2015 | Duch | F16C 19/04 384/480 |

FOREIGN PATENT DOCUMENTS

| | | | |
|---|---|---|---|
| EP | 1902863 A2 | | 3/2008 |
| EP | 2837507 A | | 2/2015 |
| EP | 2878842 A1 | | 6/2015 |
| JP | 2008298106 | * | 5/2007 |
| JP | 2012-56411 | * | 3/2012 |
| JP | 2012056411 A | | 3/2012 |
| JP | 2012154374 A | | 8/2012 |
| JP | 2016017579 A | | 2/2016 |
| WO | WO2012/107693 | * | 8/2012 |

* cited by examiner

*Primary Examiner* — James Pilkington
(74) *Attorney, Agent, or Firm* — Bryan Peckjian; SKF USA Inc. Patent Dept.

(57) ABSTRACT

A hub-bearing assembly having an axis of rotation and provided with an outer ring and an inner ring that define between them an interspace. The inner ring is provided with a flange that is transverse to the axis, and a sealing device being interposed between the outer ring and the inner ring and being provided with a moving sealing lip that is integral with the flange with the interposition of a second sealing shield, and which is directed towards a front annular surface of the outer ring.

3 Claims, 1 Drawing Sheet

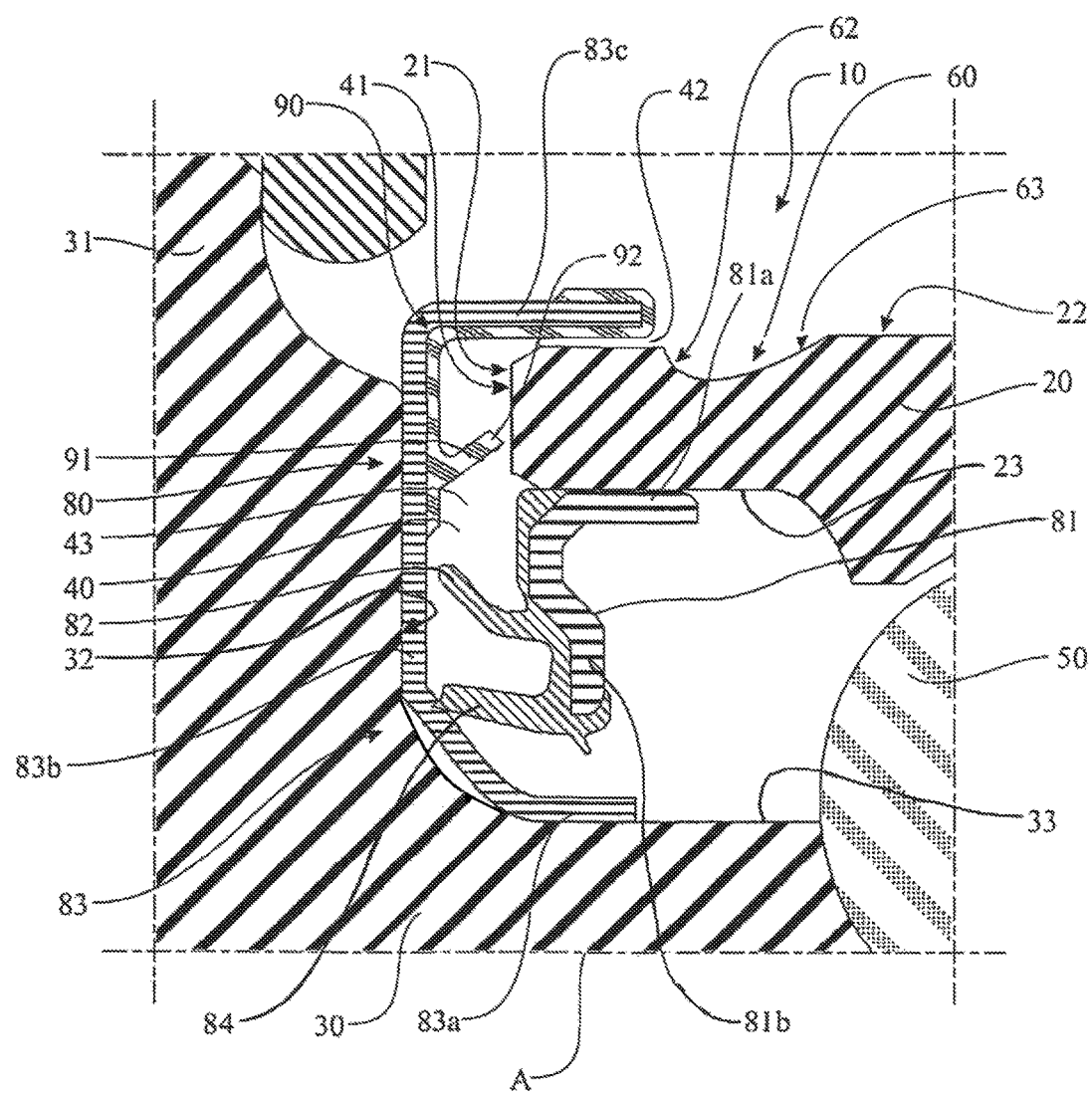

HUB-BEARING ASSEMBLY FOR A VEHICLE WHEEL

CROSS-REFERENCE

This application claims priority to Italian patent application no. 102016000106442 filed on Oct. 24, 2016, the contents of which are fully incorporated herein by reference.

TECHNOLOGICAL FIELD

The present invention relates to a hub-bearing assembly for a vehicle wheel.

BACKGROUND

Known hub-bearing assemblies have an axis of rotation and comprise:

a bearing outer ring which is radially delimited by a cylindrical outer surface that is coaxial with the axis of rotation and has a shaped groove formed through the cylindrical outer surface, and which is axially delimited by an annular outer surface transversal to the axis of rotation and adjacent to the cylindrical outer surface;

a bearing inner ring that defines with the outer ring an interspace, and is provided with a flange that is transversal to the axis of rotation; and a sealing device, which is interposed between the outer ring and the inner ring to prevent the entry of any impurities into the hub-bearing assembly through the interspace, and comprises, in turn:

a first sealing shield which is integral with the outer ring and supports a sealing lip extending axially beyond the annular outer surface towards the flange; and a second sealing shield which is integral with the inner ring and has a cylindrical wall placed around the cylindrical outer surface to define, at the position of the shaped groove, an inlet aperture of the interspace, and an annular wall placed behind the flange and in a position in front of the sealing lip.

In hub-bearing assemblies of the type described above, in order to increase the sealing capacity of the sealing device, that is to say in order to prevent the entry of contaminants and impurities into the interspace, the first sealing shield, which is essentially static because the outer ring is a static ring, is usually provided with one or more further sealing lips, each having a specific function, for example that of an oil seal or a dust seal. Such further sealing lips are commonly contacting lips, that is to say lips placed in sliding contact with the second shield or with the inner ring directly, but, although on the one hand the increase in the number of lips supported by the first shield improves the sealing capacity of the sealing device, on the other hand the presence of a plurality of contacting lips also increases the friction generated by the sealing device, possibly to the detriment of the performance of the corresponding hub-bearing assembly.

SUMMARY

The object of the present invention is to provide a hub-bearing assembly for a vehicle wheel, which, while it has a limited weight in order to be marketable in a context of increasingly stringent regulations concerning $CO_2$ emissions, also enables the sealing capacity to be increased.

According to the present invention, a hub-bearing assembly is provided for a vehicle wheel, having the characteristics stated in the attached claims.

BRIEF DESCRIPTION OF THE DRAWINGS

The present invention will now be described with reference to the attached drawing which shows schematically, in cross section and with parts removed for clarity, a non-limiting example of its embodiment in which FIG. 1 is an axially symmetrical section through the hub-bearing unit according to the preferred embodiment of the present invention.

DETAILED DESCRIPTION

With reference to FIG. 1, the number 10 indicates the whole of a hub-bearing assembly having an axis A of rotation and comprising a bearing outer ring 20, a bearing inner ring 30 defining, with the outer ring 20, an interspace 40, and a plurality of rolling bodies 50 interposed between the outer ring 20 and the inner ring 30 to enable the outer ring 20 to rotate relative to the inner ring 30.

The inner ring 30 is provided with a flange 31 transversal to the axis A of rotation for the purpose of mounting a vehicle wheel (known and not illustrated) thereon, and is axially delimited towards the inside by an annular mounting surface 32.

The outer ring 20 can be coupled to a fixed element of the vehicle, for example a suspension strut, and is axially delimited by a front annular surface 21, transversal to the axis A, which defines, with the annular mounting surface 32 of the flange 31, an inlet 41 of the interspace 40. The outer ring 20 is also radially delimited towards the outside by an outer cylindrical surface 22, distributed around the axis A of rotation and having a shaped groove 60 formed through the outer surface 22, and is further delimited towards the inside by an inner cylindrical surface 23 coaxial with the cylindrical surface 22: both the cylindrical surface 23 and the cylindrical surface 22 are contiguous with the annular surface 21, and are joined to the annular surface 21, possibly by means of chamfers or curved joints. The shaped groove 60 acts as a gutter and promotes the outflow of any contaminants towards the outside of the cylindrical surface 22, and has two ramps 62 and 63 which have inclinations differing from one another relative to the axis A of rotation and which are joined to one another on the bottom of the groove 60, the ramp 62, placed towards the flange 31, having a greater inclination than the ramp 63.

As described above, the hub-bearing assembly 10 can be interposed between a fixed element of the vehicle, for example a suspension strut, and a wheel of the vehicle, and must therefore operate in an environment which is highly contaminated by the presence of both liquids and dust: in order to maintain the technical characteristics and the correct operation of the hub-bearing assembly 10, the latter comprises a sealing device 80, which is interposed between the outer ring 20 and the inner ring 30 to prevent the entry of any impurities into the hub-bearing assembly 10 through the interspace 40, and comprises, in turn:

a sealing shield 81 fitted inside the outer ring 20 on the cylindrical surface 23 and supporting a static sealing lip 82 extending axially towards the flange 30 and beyond the annular outer surface 21; and a sealing shield 83 mounted on the inner ring 30 behind the surface 32 of the flange 31 so as to rotate about the axis A in unison with the inner ring 30.

The sealing shield 81 is preferably made of metallic material, and, in the preferred embodiment illustrated in the attached FIGURE, comprises a cylindrical portion 81*a* fitted inside the cylindrical surface 23, and a flanged portion 81*b* which is substantially transversal to the cylindrical portion 81*a* and to the axis A, and which extends towards the inner ring 30 transversely to the axis A from the cylindrical portion 81*a*. The static lip 82 is integral with the flanged portion 81*b* and extends towards the flange 31, forming what is known as a gutter, capable of collecting any liquids that penetrate into the interspace 40 through the inlet 41, in order to drain such liquids successively out of the interspace 40, also through the inlet 41, and preventing any penetration of the liquids into the hub-bearing assembly 10.

The sealing shield 81 is a purely static shield, being joined to the outer ring 20 which is also static, and, in addition to the static lip 82, may comprise a further sealing lip 84 which is placed in a position radially farther into the interspace 40 than the static lip 82, and which is in sliding contact with the sealing shield 83.

On the other hand, the sealing shield 83 is substantially a moving shield, being joined to the inner ring 30 which is also moving and can rotate about the axis A, and is also preferably made of metallic material and comprises:

a centering and mounting portion 83*a* fitted on to an outer cylindrical surface 33 of the inner ring 30 transversal to the surface 32;

an annular wall 83*b* transversal to the axis A, integral with the centering portion 83*a*, and placed axially behind the surface 32 of the flange 31; and a cylindrical portion 83*c* which is transversal and integral with the wall 83*b* and extends outside the interspace 40 towards the outer ring 20 to define, with the cylindrical surface 22 of the outer ring 20, an inlet aperture 42 communicating with the inlet 41 of the interspace 40.

In the preferred example of embodiment illustrated in the attached FIGURE, the centering and mounting portion 83*a* is shaped so as to ensure the centering of the shield 83 relative to the axis A, and so as to be placed in sliding contact with the sealing lip 84. On the other hand, the annular wall 83*b* is placed to bear axially against the surface 32 of the flange 31, and extends radially beyond the cylindrical surface 22 through the inlet 41 in a position in front of the surface 21. Finally, the cylindrical portion 83*c* extends transversely to the wall 83*b* on the opposite side from the flange 31 to the position of the groove 60 so that the aperture 42 is placed substantially at the position of the ramp 62.

Finally, the sealing device 80 comprises a layer 90 of covering material integral with the sealing shield 83, and a moving sealing lip 91 (also referred to as a dynamic lip), made in one piece with the layer 90 and extending from the annular wall 83*b* towards the annular outer surface 21 of the outer ring 20. The layer 90, which has a thickness reduced to a thickness of the shield 83, is placed so that it practically completely covers the cylindrical portion 83*c* and partially covers the annular wall 83*b* radially: in particular, the layer 90 partially covers the outside of the cylindrical portion 83*c* and completely covers the inside of the cylindrical portion, thus also defining a radial thickness of the aperture 42, and also partially covers the annular wall 83*b*, extending through the inlet 41 to a point practically close to the lip 82.

The moving sealing lip 91 has a substantially conical shape, widening towards the surface 21, comprises a terminal end portion 92 placed in front of the surface 21 without coming into sliding contact with the surface 21, and is substantially orientated in a direction axially opposed to the lip 82, with which it defines a collecting chamber 43 inside the interspace 40. The lip 91 is capable of intercepting any liquids and impurities that accidentally enter the inlet 41 through the aperture 42, and is capable of deflecting such liquids and impurities, partially by means of centrifugal action due to its rotation about the axis A, towards the surface 21, and of draining such liquids out of the inlet 41 before they can enter the collecting chamber 43. The action of the moving lip 91, directing liquids and impurities against the surface 21, sends these liquids and impurities not only towards the outside of the inlet 41, but, if necessary, into the chamber 43, forcing such liquids and impurities to pass between the terminal end portion 92 and the surface 21 in substantially direct contact with the surface 21, thus further optimizing and enhancing the gutter function of the lip 82, with which it interacts in a combined manner to drain the liquids and impurities from the interspace 40.

In order to increase its sealing capacity, the sealing device 80, instead of adding further static lips, that is to say further lips which do not rotate about the axis A, in a known manner, adds a moving lip 91 which rotates about the axis A, and which, as well as deflecting the flows of any liquid contaminants penetrating into the inlet 41, exerts a further centrifugal expelling action on these liquid contaminants, thus increasing the draining action of the sealing device 80 without increasing the difficulty of the construction of the sealing device 80, or causing further assembly problems.

In addition to the embodiments of the invention as described above, it is to be understood that there are numerous other variants. It is also to be understood that said embodiments are solely exemplary and do not limit the scope of the invention, its applications, or its possible configurations. On the contrary, although the above description enables those skilled in the art to apply the present invention in at least one exemplary configuration, it is to be understood that numerous variations of the described components may be devised, without thereby departing from the scope of the invention as defined in the appended claims, interpreted literally and/or according to their legal equivalents.

The invention claimed is:

1. A hub-bearing assembly having an axis of rotation and comprising:

an outer bearing ring radially bordered by a cylindrical outer surface coaxial to the axis of rotation and axially delimited by an annular surface transverse to the axis of rotation and adjacent to the cylindrical outer surface;

an inner bearing ring defining with the outer ring an interspace, and provided with a flange that is transverse to the axis of rotation; and a sealing device, which is interposed between the outer ring and the inner ring to prevent the entry in the hub-bearing assembly of any impurities through the interspace, and provides:

a first sealing shield joined to the outer ring and supporting a static sealing lip extending axially beyond the annular surface towards the flange;

a second sealing shield is joined with the inner ring the second sealing shield has an annular wall arranged against the flange and positioned such that the static sealing lip located on the first sealing shield faces the annular wall of the second sealing shield so that the static sealing lip extends toward the annular wall, wherein a portion of the second sealing shield extends axially to form a cylindrical portion that is located radially farther from the axis of rotation than the cylindrical outer surface of the outer bearing ring to form an aperture therebetween;

the sealing device provides a dynamic lip joined to the annular wall of the second sealing shield and directed towards the annular surface of the outer ring and is configured such that the dynamic lip drives impurities toward the annular surface, a seal material which forms the dynamic lip also extends from the dynamic lip over the cylindrical portion such that the seal material is located between the cylindrical portion and the cylindrical outer surface.

2. The hub-bearing assembly according to claim 1, wherein both the static sealing lip and the dynamic sealing lip are not contacting and are oriented in opposite axial directions relative to one another.

3. The hub-bearing assembly according to claim 2, wherein the outer ring of the bearing provides a groove formed on the outer cylindrical surface, the second sealing shield comprising the cylindrical portion placed around the cylindrical outer surface to define, with respect to the groove, an inlet area of the interspace.

* * * * *